(12) United States Patent
Arimoto et al.

(10) Patent No.: US 12,276,622 B2
(45) Date of Patent: Apr. 15, 2025

(54) STATE CHANGE TRACKING DEVICE, X-RAY IMAGING SYSTEM, STATE CHANGE TRACKING METHOD OF INSPECTION TARGET, AND LIFE ESTIMATING METHOD OF INSPECTION TARGET

(71) Applicant: Konica Minolta Inc., Tokyo (JP)

(72) Inventors: Tadashi Arimoto, Hino (JP); Ikuma Ota, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 250 days.

(21) Appl. No.: 17/506,233

(22) Filed: Oct. 20, 2021

(65) Prior Publication Data

US 2022/0155245 A1   May 19, 2022

(30) Foreign Application Priority Data

Nov. 16, 2020   (JP) ................................. 2020-189980

(51) Int. Cl.
| | | |
|---|---|---|
| *G01N 23/083* | (2018.01) | |
| *G01N 23/041* | (2018.01) | |
| *G01N 23/18* | (2018.01) | |
| *G01N 23/201* | (2018.01) | |
| *G06T 7/00* | (2017.01) | |

(52) U.S. Cl.
CPC ......... *G01N 23/083* (2013.01); *G01N 23/041* (2018.02); *G01N 23/18* (2013.01); *G01N 23/201* (2013.01); *G06T 7/0004* (2013.01); *G01N 2223/401* (2013.01); *G06T 2207/10116* (2013.01); *G06T 2207/30108* (2013.01)

(58) Field of Classification Search
CPC .... G01N 23/083; G01N 23/041; G01N 23/18; G01N 23/201; G01N 2223/401; G01N 2223/054; G01N 2223/629; G01N 2223/632; G01N 2223/646; G06T 7/0004; G06T 2207/10116; G06T 2207/30108
USPC ........................................................ 382/103
See application file for complete search history.

(56) References Cited

U.S. PATENT DOCUMENTS

2019/0170668 A1 *  6/2019  Kitamura et al. ..... A61B 6/484
2019/0317027 A1 * 10/2019  Tsuboi ................. G01N 23/041

FOREIGN PATENT DOCUMENTS

| JP | 2013-11521 A | 1/2013 |
|---|---|---|
| JP | 2019-100860 A | 6/2019 |
| JP | 2019207156 A | 12/2019 |
| WO | 2015159469 A1 | 10/2015 |

OTHER PUBLICATIONS

Japanese Office Action (JPOA) mailed on Jun. 11, 2024 and issued for Japanese patent application No. 2020-189980 and its English machine translation.

(Continued)

*Primary Examiner* — Huy C Ho
(74) *Attorney, Agent, or Firm* — RANKIN, HILL & CLARK LLP (57) ABSTRACT

A state change tracking device includes: a hardware processor that non-destructively tracks a state change of an inspection target by a plurality of reconstructed images acquired by imaging the inspection target placed under a specific environment by an X-ray Talbot imaging device over time.

14 Claims, 7 Drawing Sheets

(56) References Cited

OTHER PUBLICATIONS

Atsushi Memose et al., "in situ X-ray Phase Tomography of Polymer Blend Phase Seperation", Photon Factory Activity Report 2014 #32(2015)B, <URL: http://pfwww.kek.jp/acr.2014pdf/part_b/pf14b0245.pdf>; Cited in JPOA.
Japanese Office Action (JPOA) dated Aug. 20, 2024 for Japanese Patent Application No. 2020-189980; English translation.

* cited by examiner

STATE CHANGE TRACKING DEVICE, X-RAY IMAGING SYSTEM, STATE CHANGE TRACKING METHOD OF INSPECTION TARGET, AND LIFE ESTIMATING METHOD OF INSPECTION TARGET

The entire disclosure of Japanese patent Application No. 2020-189980, filed on Nov. 16, 2020, is incorporated herein by reference in its entirety.

BACKGROUND

Technological Field

The present invention relates to a state change tracking device, an X-ray imaging system, a state change tracking method of an inspection target, and a life estimating method of an inspection target.

Description of the Related Art

Conventionally, there has been proposed a remaining life evaluating method of irradiating a stainless steel welded portion with an ultrasonic wave and analyzing a reflection signal reflected from a minute defect to derive an estimated life of the welded portion (refer to, for example, JP 2013-11521 A).

Specifically, claim 1 in JP 2013-11521 A discloses "A remaining life evaluating method of evaluating a remaining life of a welded portion on the basis of minute defects generated on the welded portion formed of high chromium steel, the method comprising: an analysis signal acquisition step of analyzing a reflection signal reflected from the minute defects generated on the welded portion irradiated with an ultrasonic wave to acquire an analysis signal; a minute defect number density estimation step of deriving an estimated number density of the minute defects from the acquired analysis signal on the basis of first correlation data indicating a correlation between the analysis signal and the number density of the minute defects; and a remaining life estimation step of deriving the estimated remaining life of the welded portion from the estimated number density on the basis of second correlation data indicating a correlation between the number density of the minute defects and the remaining life of the welded portion".

In general, in a case of estimating a life of a sample, which is an inspection target, knowledge regarding the life is obtained by placing the sample in an accelerated test environment and the like and performing a test until the sample actually reaches a limit state. In this case, since an accelerated test is performed until the inspection target reaches the limit state, a considerable time is required until the test ends.

In a general life estimating method, the inspection target is mainly evaluated by sensory evaluation by human senses (visual sense, tactile sense and the like). Therefore, variations are likely to occur due to subjective judgment of an evaluator, and accuracy is lowered. Human sensory evaluation is qualitative, and there also is a problem that a progress until the inspection target reaches its limit is not known.

SUMMARY

In view of the above-described circumstances, an object of the present invention is to shorten a test time for life estimation and quantify an index of the life estimation in a state change tracking device, an X-ray imaging system, a state change tracking method of an inspection target, and a life estimating method of an inspection target.

To achieve the abovementioned object, according to an aspect of the present invention, a state change tracking device reflecting one aspect of the present invention comprises a hardware processor that non-destructively tracks a state change of an inspection target by a plurality of reconstructed images acquired by imaging the inspection target placed under a specific environment by an X-ray Talbot imaging device over time.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments. In the description of the drawings, the same components are assigned with the same reference signs, and the description thereof is not repeated as appropriate.

[Overall Configuration]

Figure 1:
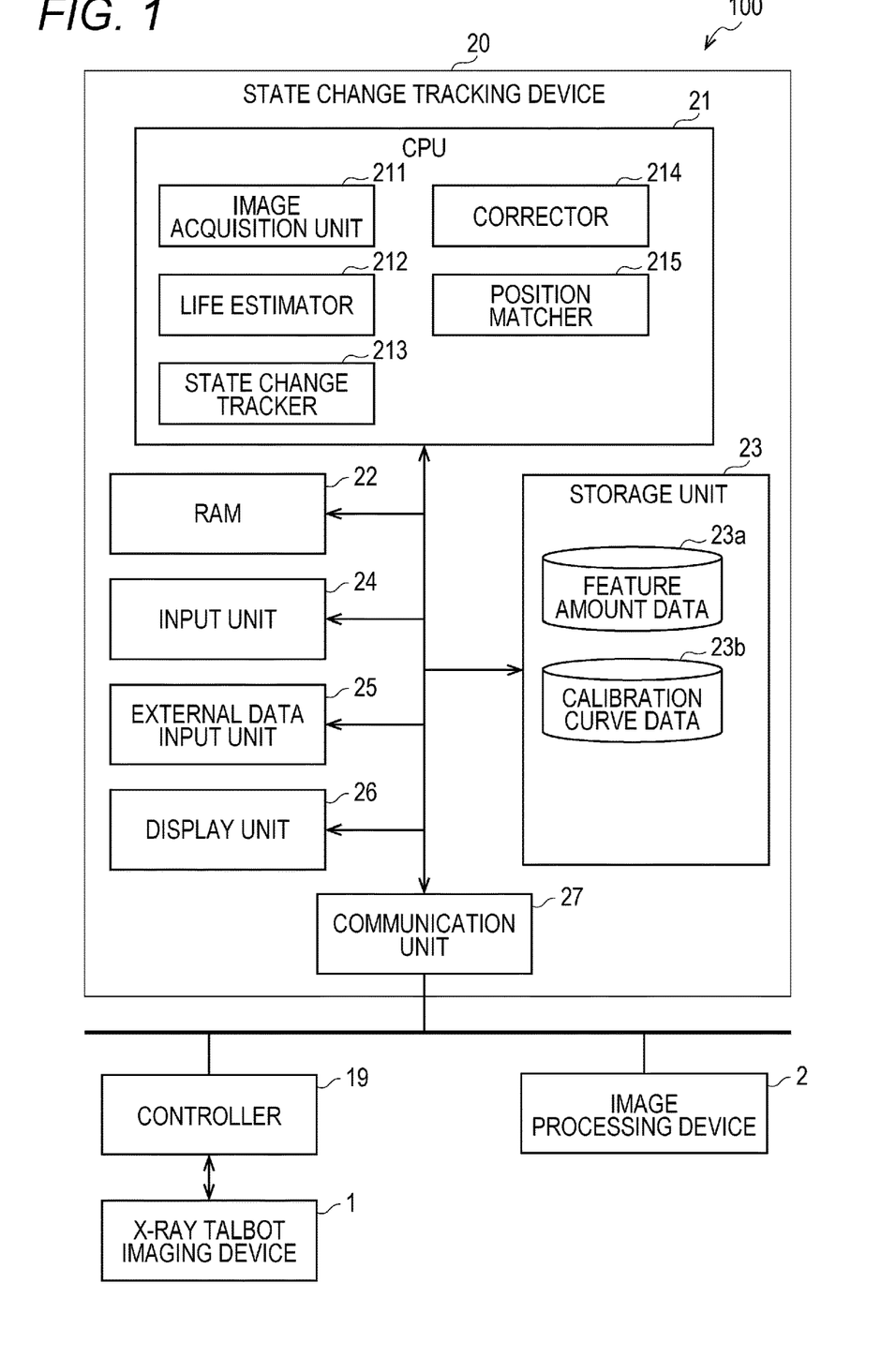
FIG. 1 is a block diagram illustrating a configuration of an X-ray imaging system according to this embodiment.

FIG. 1 is a block diagram illustrating a configuration of an X-ray imaging system 100 according to this embodiment. As illustrated in FIG. 1, the X-ray imaging system 100 according to this embodiment is provided with an X-ray Talbot imaging device 1, a controller 19, an image processing device 2, and a state change tracking device 20. The X-ray Talbot imaging device 1 is communicably connected to the image processing device 2 and the state change tracking device 20 via the controller 19 and a bus.

In this embodiment, the X-ray imaging system 100 only needs to acquire a Talbot image (reconstructed image) captured by the X-ray Talbot imaging device 1 to be described later and extract signal intensity or signal intensity distribution of the Talbot image (a feature amount of the reconstructed image) by the state change tracking device 20, so that the X-ray Talbot imaging device 1 is not an essential component.

<Regarding X-Ray Talbot Imaging Device>

Figure 2:
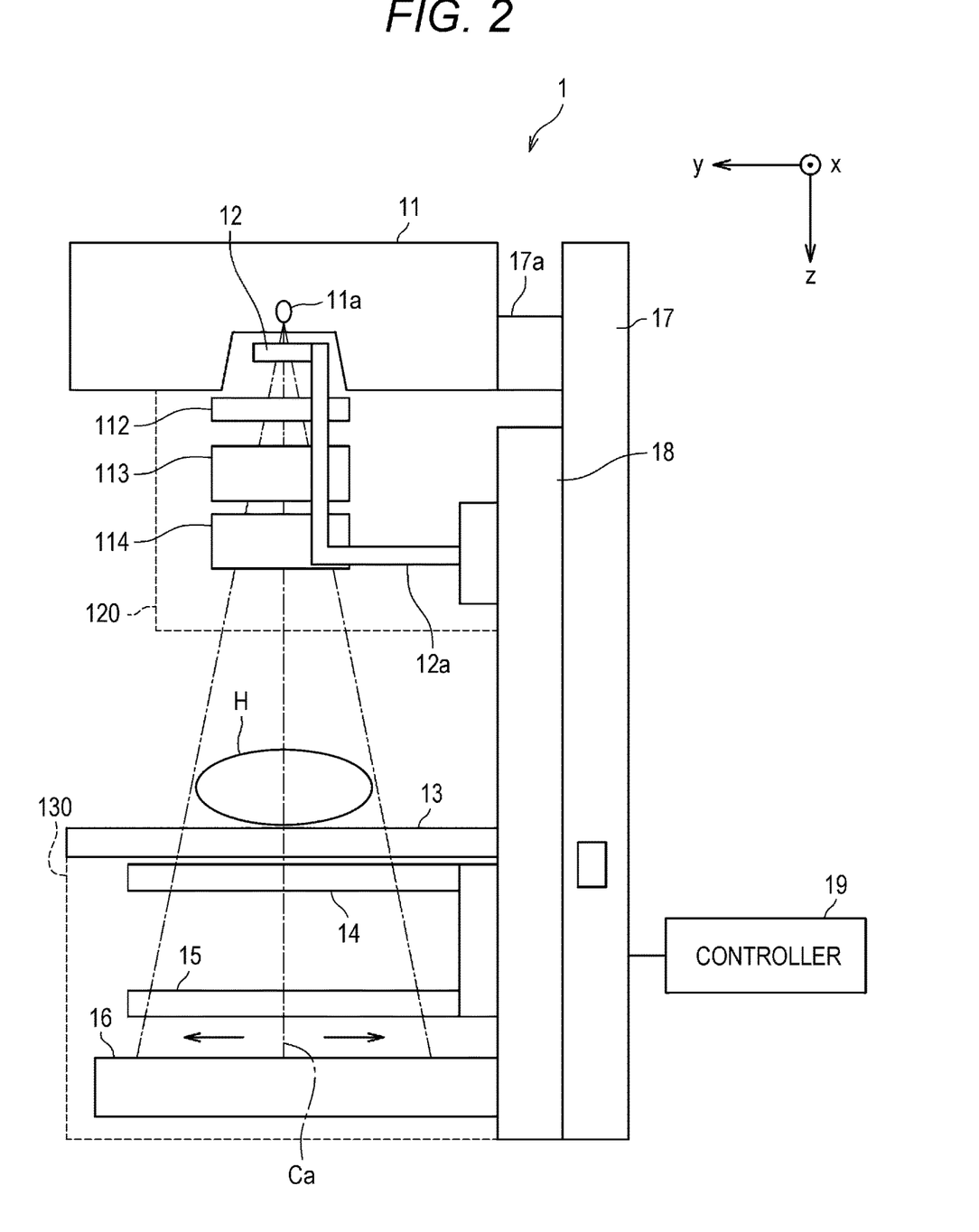
FIG. 2 is a schematic diagram illustrating an overall configuration of an X-ray Talbot imaging device.

FIG. 2 is a schematic diagram illustrating an overall configuration of the X-ray Talbot imaging device 1. The X-ray Talbot imaging device 1 is provided with an X-ray generation device 11, a source grating 12, a subject table 13, a first grating 14, a second grating 15, an X-ray detector 16, a support column 17, and a base 18.

The X-ray Talbot imaging device 1 of this embodiment adopts a configuration using a Talbot-Lau interferometer provided with the source grating 12. The source grating 12 is provided with a multi-grating, a multi-slit, and a G0 grating. The X-ray Talbot imaging device 1 may also adopt a configuration using a Talbot interferometer provided only with the first grating (also referred to as a G1 grating) 14 and the second grating (also referred to as a G2 grating) 15 without the source grating 12 provided, for example.

The X-ray Talbot imaging device 1 captures a moire image Mo (refer to FIG. 3) of a subject H at a predetermined position with respect to the subject table 13 by a method based on a principle of a fringe scanning method. The image processing device 2 reconstructs at least three types of images (two-dimensional images) by analyzing the captured moire image Mo by a Fourier transform method.

Herein, the fringe scanning method is a method of acquiring a high-definition reconstructed image by reconstructing by using the moire images Mo captured M times while moving one of a plurality of gratings in a slit period direction by a 1/M slit period of the grating (M is a positive integer; M>2 for an absorption image and M>3 for a differential phase image and a small-angle scattered image).

The Fourier transform method is a method of performing Fourier transform on the moire image Mo and reconstructing to generate an image such as the differential phase image by the image processing device 2.

Herein, first, a principle common to the Talbot interferometer and the Talbot-Lau interferometer is described with reference to FIG. 3.

Figure 3:
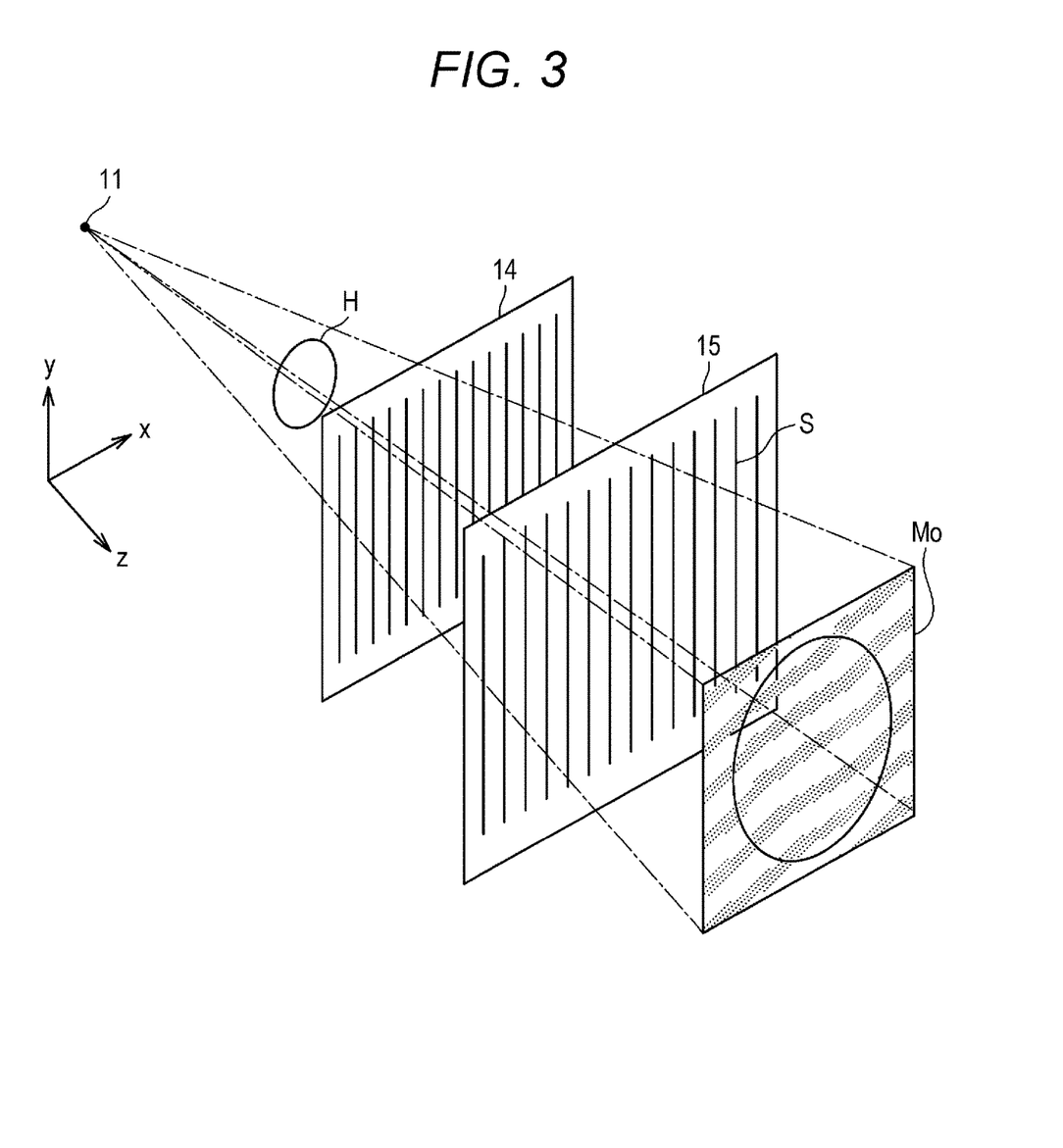
FIG. 3 is an explanatory view illustrating a principle of a Talbot interferometer of the X-ray imaging system according to this embodiment.

FIG. 3 is an explanatory view illustrating the principle of the Talbot interferometer of the X-ray imaging system 100 according to this embodiment. Although FIG. 3 illustrates a case of the Talbot interferometer, a case of the Talbot-Lau interferometer is basically similarly described.

A z direction in FIG. 3 corresponds to a vertical direction in the X-ray Talbot imaging device 1 in FIG. 2, and x and y directions in FIG. 3 correspond to a horizontal direction (front-back direction and right-left direction) in the X-ray Talbot imaging device 1 in FIG. 2.

Figure 4:
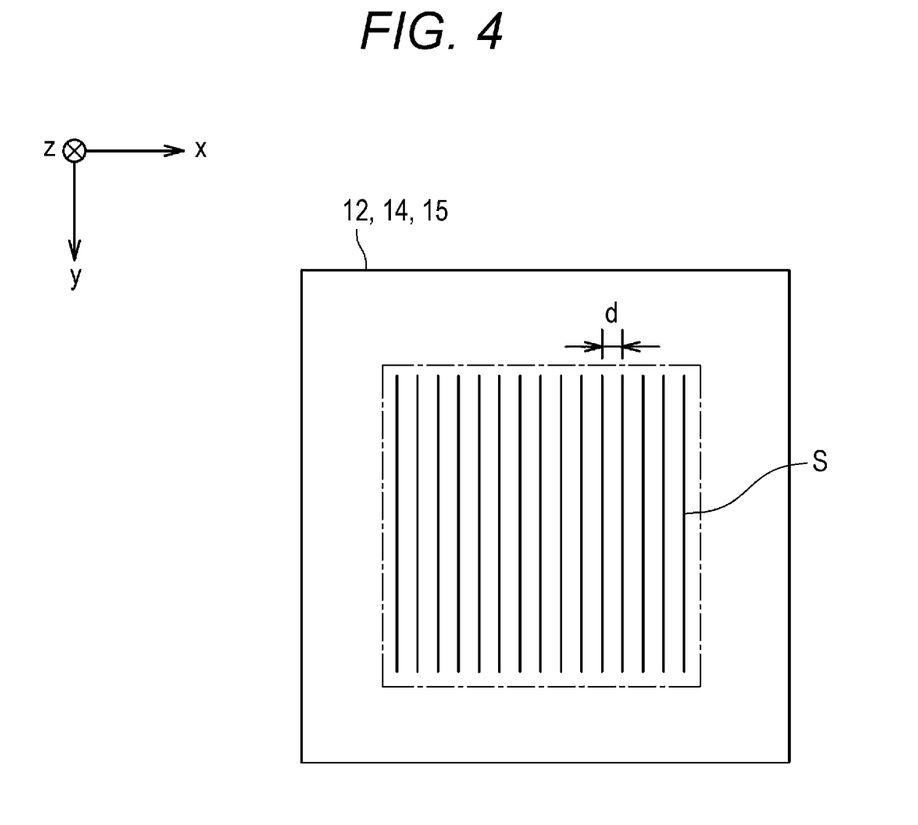
FIG. 4 is an explanatory view illustrating a first grating and a second grating of the X-ray Talbot imaging device.

FIG. 4 is an explanatory view illustrating the source grating 12, the first grating 14, and the second grating 15 of the X-ray Talbot imaging device 1 of this embodiment.

As illustrated in FIG. 4, in the source grating 12, the first grating 14, and the second grating 15, a plurality of slits S is formed in array at a predetermined period d in the x direction orthogonal to the z direction, which is an X-ray irradiation direction. Such array of the slits S forms a one-dimensional grating, and an array of the slits S in the x direction and the y direction forms a two-dimensional grating.

In a case of the Talbot-Lau interferometer, in the source grating 12 (refer to FIG. 2), a plurality of slits S is formed in array at a predetermined period d in the x direction orthogonal to the z direction, which is the X-ray irradiation direction.

In FIG. 4, in the source grating 12, the first grating 14, and the second grating 15 of this embodiment, the one-dimensional grating is adopted as an example, but the two-dimensional grating may also be adopted.

As illustrated in FIG. 3, when an X-ray applied from an X-ray source 11a (not illustrated) of the X-ray generation device 11 is transmitted through the first grating 14, the transmitted X-ray forms an image at a regular interval in the z direction. This image is referred to as a self-image (also referred to as a grating image and the like), and a phenomenon that the self-image is formed at a regular interval in the z direction in this manner is referred to as a Talbot effect.

That is, the Talbot effect refers to a phenomenon that, when coherent light is transmitted through the first grating 14 provided with the slits S at a predetermined period d as illustrated in FIG. 4, the self-image thereof is formed at a regular interval in a travel direction of the light.

In a case of the Talbot-Lau interferometer, the X-ray applied from the X-ray source 11a (not illustrated) of the X-ray generation device 11 is made a multiple light source by the source grating 12 (refer to FIG. 2), and is transmitted through the first grating 14.

Herein, in this embodiment, the image generated by the Talbot effect is referred to as the Talbot image. As described above, the absorption image, the differential phase image, and the small-angle scattered image are the reconstructed images acquired by reconstructing the moire image Mo, and are the Talbot images generated by the above-described Talbot effect. The "Talbot effect" is used as a term including not only the Talbot effect by the Talbot interferometer but also an effect of combination of the Talbot effect and a Lau effect (obtained due to the G0 grating) by the Talbot-Lau interferometer.

As illustrated in FIG. 3, the second grating 15 provided with the slits S as is the case with the first grating 14 is arranged at a position where the self-image of the first grating 14 is formed. At that time, when the second grating 15 is arranged such that an extending direction of the slit S thereof (that is, the y direction in FIG. 3) is substantially parallel to an extending direction of the slit S of the first grating 14, the moire image Mo is acquired on the second grating 15.

In FIG. 3, when the moire image Mo is illustrated on the second grating 15, moire fringes and the slit S are mixed and it is difficult to visually recognize them, so that the moire image Mo is illustrated away from the second grating 15 for convenience. However, the moire image Mo is actually formed on the second grating 15 and on a downstream side thereof. The moire image Mo is captured by the X-ray detector 16 arranged immediately below the second grating 15.

When the subject H is present between the X-ray source 11a (not illustrated in FIG. 3) of the X-ray generation device 11 and the first grating 14 as illustrated in FIGS. 2 and 3, a phase of the X-ray is shifted by the subject H, so that the moire fringes of the moire image Mo are disturbed at a peripheral edge of the subject H as a boundary. In contrast, although not illustrated, if the subject H is not present between the X-ray source 11a of the X-ray generation device 11 and the first grating 14, the moire image Mo including only the moire fringes appears.

In this manner, the Talbot interferometer and the Talbot-Lau interferometer generate the Talbot image by using the principle that the moire fringes of the moire image Mo are disturbed at the peripheral edge of the subject H as the boundary due to the phase shift of the X-ray.

On the basis of this principle, in the X-ray Talbot imaging device 1 of this embodiment, as illustrated in FIG. 2, the second grating 15 is arranged at a position where the self-image of the first grating 14 is formed in a second cover unit 130. As described above, the moire image Mo is blurred (refer to FIG. 3) when the second grating 15 and the X-ray detector 16 (refer to FIG. 2) are separated from each other, so that, in this embodiment, the X-ray detector 16 is arranged immediately below the second grating 15. In this embodiment, the second grating 15 may be formed of a luminescent material such as a scintillator or amorphous selenium, and the second grating 15 and the X-ray detector 16 may be integrated.

The second cover unit 130 is provided to prevent a person or an object from hitting or touching the first grating 14, the second grating 15, or the X-ray detector 16, and to protect the X-ray detector 16.

Herein, the X-ray detector 16 in which conversion elements that generate electric signals in accordance with the applied X-ray are two-dimensionally arranged (in a matrix) is configured to read the electric signals generated by the conversion elements as image signals. In this embodiment, the X-ray detector 16 captures the above-described moire image Mo, which is the image of the X-ray formed on the second grating 15, as the image signal of each conversion element. A pixel size of the X-ray detector 16 is, for example, 10 to 300 (μm), and more preferably 50 to 200 (μm).

A flat panel detector (FPD) may be used as the X-ray detector 16. The FPD includes an indirect conversion type that converts the detected X-ray into the electric signals via photoelectric conversion elements and a direct conversion type that directly converts the detected X-ray into the electric signals, and any of them may be used.

In the indirect conversion type, the photoelectric conversion elements are two-dimensionally arranged together with thin film transistors (TFTs) under a scintillator plate of CsI, Gd2O2S and the like to form the respective pixels. When the X-ray incident on the X-ray detector 16 is absorbed by the scintillator plate, the scintillator plate emits light. Charge is accumulated in each photoelectric conversion element by the emitted light, and the accumulated charge is read out as the image signal.

In the direct conversion type, an amorphous selenium film having a film thickness of 100 to 1000 (μm) is formed on glass by thermal vapor deposition of amorphous selenium, and the amorphous selenium film and an electrode are vapor-deposited on an array of the TFTs arranged two-dimensionally. When the amorphous selenium film absorbs the X-ray, a voltage is isolated into a substance in a form of electron-hole pair, and a voltage signal between the electrodes is read by the TFTs. The X-ray detector 16 may use a charge coupled device (CCD) or an imaging means of an X-ray camera.

The X-ray Talbot imaging device 1 captures a plurality of moire images Mo using the fringe scanning method. That is, the X-ray Talbot imaging device 1 captures a plurality of moire images Mo while shifting a relative position between the first grating 14 and the second grating 15 in the x direction (that is, a direction orthogonal to the extending direction of the slit S (y direction)) in FIG. 3 from the position in FIG. 2. The X-ray Talbot imaging device 1 transmits the image signals of a plurality of captured moire images Mo to the image processing device 2.

In this manner, the X-ray Talbot imaging device 1 moves the first grating 14 in the x direction by a predetermined amount in order to capture a plurality of moire images Mo by the fringe scanning method. The X-ray Talbot imaging device 1 may move the second grating 15 instead of moving the first grating 14, or move both the first grating 14 and the second grating 15.

The X-ray Talbot imaging device 1 may capture only one moire image Mo while fixing the relative position between the first grating 14 and the second grating 15, and the image processing device 2 may analyze the captured one moire image Mo by using the Fourier transform method to reconstruct the absorption image, the differential phase image, and the small-angle scattered image. In a case of capturing one moire image Mo, the X-ray Talbot imaging device 1 transmits the image signals of one moire image Mo to the image processing device 2.

Next, a configuration of other portions in the X-ray Talbot imaging device 1 is described. The X-ray Talbot imaging device 1 of this embodiment is a so-called vertical type, in which the X-ray generation device 11, the source grating 12, the subject table 13, the first grating 14, the second grating 15, and the X-ray detector 16 are arranged in this order in the z direction, which is the direction of gravity. That is, in this embodiment, the z direction is the X-ray irradiation direction from the X-ray generation device 11.

The X-ray generation device 11 (refer to FIG. 2) is provided with, as the X-ray source 11a, for example, a Coolidge X-ray source or a rotary anode X-ray source widely used in a medical setting in general. Other X-ray sources may also be used. The X-ray generation device 11 applies the X-ray in a cone beam shape from a focal point. That is, as illustrated in FIG. 2, with an X-ray irradiation axis Ca coinciding with the z direction as a central axis, the X-ray is applied so as to spread as a distance from the X-ray generation device 11 increases. A range irradiated by the X-ray generation device 11 is referred to as an X-ray irradiation range.

In this embodiment, the source grating 12 is provided below the X-ray generation device 11. Herein, in order to prevent vibration of the X-ray generation device 11 caused by rotation of an anode of the X-ray source 11a from being transmitted to the source grating 12, in this embodiment, the source grating 12 is attached to a fixing member 12a of the base 18.

In this embodiment, in order to prevent the vibration of the X-ray generation device 11 from propagating to other portions of the X-ray Talbot imaging device 1 of the support column 17, a buffer member 17a is provided between the X-ray generation device 11 and the support column 17. According to this, the vibration of the X-ray generation device 11 is suppressed from propagating to the support column 17.

In this embodiment, in addition to the source grating 12, a filtration filter (also referred to as an additional filter) 112 for changing a quality of the X-ray transmitted through the source grating 12, an irradiation field stop 113 for narrowing an irradiation field of the applied X-ray, and an irradiation field lamp 114 for irradiating the subject with visible light instead of the X-ray to perform position matching before irradiating the same with the X-ray are attached to the fixing member 12a.

The source grating 12, the filtration filter 112, and the irradiation field stop 113 are not necessarily provided in this order. In this embodiment, a first cover unit 120 for protecting them is arranged around the source grating 12.

The subject table 13 is a table on which the subject H is placed. The subject table 13 serves as a rotary stage that rotates the subject H about a z axis. In a case of capturing a plurality of moire images Mo by using the above-described fringe scanning method, the X-ray Talbot imaging device 1 captures a plurality of moire images Mo while rotating the subject table 13 at different angles.

<Regarding Subject>

The subject H in this embodiment illustrated in FIGS. 2 and 3 is not especially limited, but includes, for example, a simple substance of resin, metal, ceramics and the like or a composite material thereof. The composite material refers to a material in which two or more different materials are integrally combined in which at least two materials are present as phases.

As such composite material, for example, fiber-reinforced plastics (FRPs) represented by carbon fiber-reinforced plastics (CFRPs), carbon fiber-reinforced thermo plastics (CFRTPs), and glass fiber-reinforced plastics (GFRPs) using carbon fiber and glass fiber as reinforcing fiber, ceramic matrix composites (CMCs) using ceramic fiber as a reinforcing material and the like are known.

The composite material is used as a component of various products and the like including, for example, space/aircraft related products, automobiles, ships, fishing rods, electric/electronic/home appliance components, parabolic antennas, bathtubs, floor materials, roof materials and the like.

In a broad sense, for example, composite materials made of a plurality of types of wood such as plywood are also included. In addition, for example, composite materials formed without containing fiber such as metal matrix composites (MMC) concrete and reinforced concrete may also be included.

Resin used in the composite material is, for example, general-purpose plastic, engineering plastic, or super engineering plastic, but is not especially limited thereto. For example, a composition used as a resin composite material in which a filler having a micro-sized or nano-sized structure is added to resin in order to add a predetermined characteristic such as strength and is plastic molded is also included. The filler includes an organic material, an inorganic material, a magnetic material, and a metal material.

For example, in a case where strength and rigidity are required for a plastic molded product, a composite material in which polyphenylene sulfide (PPS), polyacetal (POM), polyamide (PA) and the like is used as the resin, and glass fiber (GF), aramid fiber, mica (mica) and the like is added as the filler is used. In a case where the plastic molded product is a thin product, a composite material in which a liquid crystal polymer is used and GF is added may be used. In a case where the plastic molded product is a plastic magnet, a composite material in which nylon is used as the resin, and strontium ferrite, samarium cobalt and the like is added as the filler is used.

In this manner, an inspection target, which is the subject H, may contain resin as a main component.

<Regarding Controller>

In this embodiment, the controller 19 illustrated in FIG. 1 is formed of a general-purpose computer in which a central processing unit (CPU) (not illustrated), a read only memory (ROM) (not illustrated), a random access memory (RAM) (not illustrated), an input/output interface (not illustrated) and the like are connected to a bus. The controller 19 may be formed as a dedicated control device instead of a general-purpose computer as in this embodiment. The controller 19 is also provided with appropriate means and devices such as an input means (not illustrated) including an operation unit, an output means (not illustrated), a storage means (not illustrated), and a communication means (not illustrated). The output means includes a display unit (not illustrated) that displays information required for performing various operations of the X-ray Talbot imaging device 1 and/or the generated reconstructed image.

The controller 19 generally controls the X-ray Talbot imaging device 1. That is, the controller 19 is connected to the X-ray generation device 11, and sets a tube voltage, a tube current, an irradiation time and the like of the X-ray source 11a. The controller 19 may also be configured to relay transmission and reception of signals and data between the X-ray detector 16 and an external image processing device 2 and the like.

That is, the controller 19 serves as a control unit that causes a series of imaging for acquiring one or a plurality of moire images Mo required for generating the reconstructed image of the subject H.

<Regarding Image Processing Device>

The image processing device 2 illustrated in FIG. 1 receives the image signals of one or a plurality of moire images Mo transmitted from the X-ray Talbot imaging device 1, and reconstructs the absorption image, the differential phase image, and the small-angle scattered image (that is, performs image reconstruction) on the basis of the received moire image Mo.

The image processing device 2 reconstructs at least three types of images (two-dimensional images) by analyzing the moire image Mo by the Fourier transform method as image processing. That is, the image processing device 2 generates three types of reconstructed images including the absorption image (the same image as a normal X-ray absorption image) acquired by imaging average components of the moire fringes in the moire image Mo, the differential phase image acquired by imaging phase information of the moire fringes, and the small-angle scattered image acquired by imaging visibility (definition) of the moire fringes. It is also possible to further recompose these three types of reconstructed images to generate many types of reconstructed images.

The image processing device 2 reconstructs one or a plurality of moire images Mo transmitted from the X-ray Talbot imaging device 1, and then transmits the reconstructed image to the state change tracking device 20.

<Regarding State Change Tracking Device>

The state change tracking device 20 illustrated in FIG. 1 is formed of, for example, a general-purpose computer (control PC). The state change tracking device 20 is not limited thereto, and it is also possible to provide a part of functions of the state change tracking device 20 on a network not illustrated and execute each processing by exchanging data by communication. In this embodiment, the image processing device 2 or the controller 19 may have the function of the state change tracking device 20 described below.

As illustrated in FIG. 1, the state change tracking device 20 according to this embodiment is provided with a CPU 21, a RAM 22, a storage unit 23, an input unit 24, an external data input unit 25, a display unit 26, and a communication unit 27.

The CPU 21 reads out various programs such as a system program and a processing program stored in the storage unit 23, develops the programs in the RAM 22, and executes the developed programs to embody respective functional units. Specifically, the CPU 21 executes the programs to embody an image acquisition unit 211, a life estimator 212, a state change tracker 213, a corrector 214, and a position matcher 215.

The image acquisition unit 211 acquires the reconstructed image of the inspection target captured by the X-ray Talbot imaging device 1. The reconstructed image refers to the Talbot image generated by the Talbot effect including the absorption image, the differential phase image, and the small-angle scattered image Hereinafter, the reconstructed image refers to the Talbot image. The state change tracking device 20 may read out a change in internal structure of the inspection target put under a specific environment by the Talbot image, and analyzes the information to estimate a life.

The life estimator 212 acquires the reconstructed image of the inspection target captured by the X-ray Talbot imaging device 1 by the image acquisition unit 211, and estimates the life of this inspection target on the basis of the reconstructed image. In this case, the life estimator 212 extracts a feature amount from the reconstructed image of the inspection target newly captured by the X-ray Talbot imaging device 1, extrapolates the feature amount to a calibration curve generated by the state change tracker 213, and estimates the life of this new inspection target.

The state change tracker 213 non-destructively tracks a state change of the inspection target by a plurality of reconstructed images acquired by imaging the inspection target put under the specific environment by the X-ray Talbot imaging device 1 over time. Furthermore, the state change tracker 213 extracts the feature amount of the reconstructed images continuously changing until the inspection target reaches an end of a life using a plurality of reconstructed images captured over time, and derives a threshold of the feature amount corresponding to the life of the inspection target.

Herein, the state change of the inspection target corresponds to, for example, generation and growth of a defect such as a crack and a void, deformation such as a sink mark, distortion, and warpage, a change in resin flow, fiber orientation and the like. More specifically, for example, for the crack, the state change tracker 213 tracks a change in length, width, depth, the number and the like as the state change of the inspection target. For the void, the state change tracker 213 tracks a change in size, the number and the like as the state change of the inspection target. The state change of the crack, the void and the like is an example, and is not limited thereto.

The state change tracker 213 plots the feature amount with respect to an elapsed time during which the inspection target is placed under the specific environment to create the calibration curve. The feature amount of the reconstructed image corresponds to, for example, signal intensity, signal intensity distribution and the like of the Talbot image to be described later.

Herein, the specific environment includes, for example, an environment exposed to a specific chemical substance, an environment subjected to a stress, an environment heated or cooled and the like.

The environment subjected to a stress corresponds to, for example, an environment in which the inspection target is subjected to an external stress such as tension, compression, or a shear stress, or an environment in which this is subjected to an internal stress such as a residual stress. An environment in which the stress is relaxed by processing such as annealing is also included to this.

The corrector 214 acquires a shape of the inspection target and/or the subject in a plurality of captured reconstructed images, and corrects an inclination, a position, and a size of the reconstructed image on the basis of the acquired shape and/or the subject.

The position matcher 215 performs position matching of a plurality of reconstructed images of the inspection target captured over time.

The RAM 22 serves as a work area that temporarily stores various programs read out from the storage unit 23 and may be executed by the CPU 21, input or output data, parameters and the like in various pieces of processing executed and controlled by the CPU 21.

The storage unit 23 is provided with databases 23a and 23b. The storage unit 23 is formed of, for example, a hard disk drive (HDD) or a semiconductor nonvolatile memory. The storage unit 23 stores various programs and various data.

The database 23a is a database that stores an actual measurement value obtained by associating the feature amount at each position extracted from the reconstructed image by the state change tracker 213 with an elapsed time or an elapsed day equivalent (referred to as feature amount data), and the calibration curve obtained by approximating the actual measurement value to a straight line. As a result, when the crack is generated in the inspection target, the state change tracker 213 may refer to the database 23a, extract the feature amount correlated with the elapsed time, and derive the threshold corresponding to the life of the inspection target. The threshold corresponding to the life of the inspection target is derived by extrapolating the calibration curve related to the extracted feature amount until the elapsed time when the crack is generated. The derivation of the threshold of the feature amount is described later with reference to FIG. 7. The database 23a also stores the position of the reconstructed image related to the feature amount correlated with the elapsed time and an inclination of the calibration curve related to the feature amount.

The database 23b is a database that stores data obtained by generating a calibration curve for the new inspection target (referred to as calibration curve data) on the basis of the feature amount at this position of the new inspection target. As a result, the life estimator 212 may estimate the elapsed time or the elapsed day equivalent until the end of life of the new inspection target by extrapolating the calibration curve of the feature amount at a predetermined position of the new inspection target until this reaches the threshold. The estimation of the life is described later with reference to FIG. 9.

The input unit 24 is provided with a keyboard provided with cursor keys, numeric input keys, various function keys and the like, and a pointing device such as a mouse. The input unit 24 outputs a press signal of a pressed key of the keyboard and an operation signal by the mouse to the CPU 21 as input signals. The CPU 21 executes various pieces of processing on the basis of the operation signal from the input unit 24.

The external data input unit 25 is for inputting data acquired from an external device (including the controller 19) to the state change tracking device 20. As the external data input unit 25, for example, various devices such as a universal serial bus (USB: registered trademark) port that enables wired or wireless data transmission and reception with the external device, Bluetooth (registered trademark), a drive that reads data from a recording medium corresponding to the external device and the like may be adopted, for example.

The display unit 26 is provided with a monitor such as a cathode ray tube (CRT) or a liquid crystal display (LCD), for example. The display unit 26 displays various screens in accordance with an instruction of a display signal input from the CPU 21. For example, the display unit 26 displays the reconstructed image received from the image processing device 2. In a case of adopting a touch panel as the display unit 26, the display unit 26 also has a function as the input unit 24.

The communication unit 27 is provided with a communication interface and communicates with the external device on the network, for example, the image processing device 2. The communication unit 27 may also be shared with the external data input unit 25 described above.

[Generation Processing of Database of Feature Amount Data]

Figure 5:
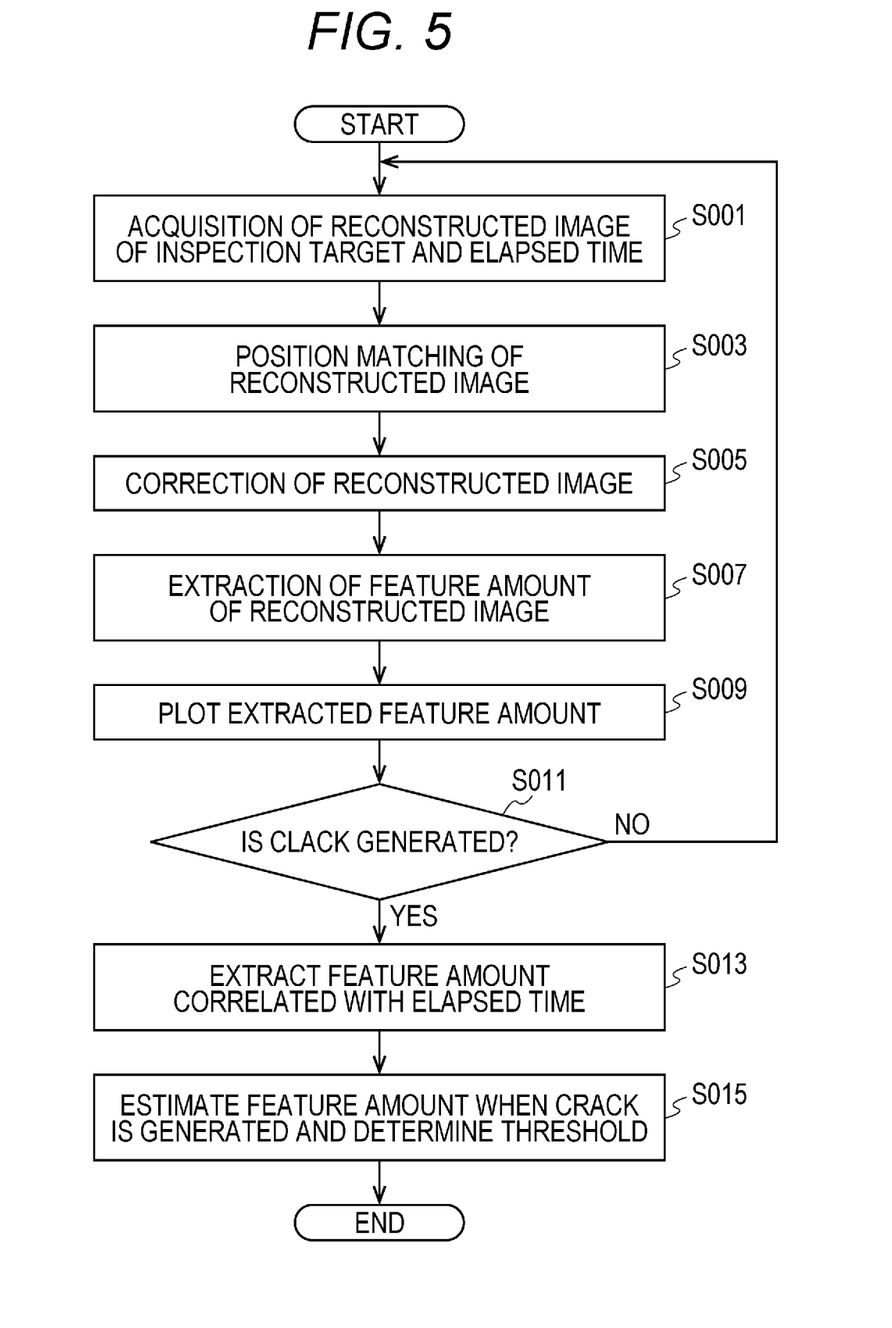
FIG. 5 is a flowchart illustrating processing of generating a database of feature amount data in a state change tracking device.

Next, processing of generating the database 23a of the feature amount data of the state change tracking device 20 having the above-described configuration is described using a flowchart in FIG. 5 with reference to FIG. 1.

FIG. 5 is the flowchart illustrating the processing of generating the database 23a of the feature amount data in the state change tracking device 20. In this embodiment, the inspection target (subject H) is placed under the specific environment such as the environment exposed to a specific chemical substance, the environment subjected to a stress, and the environment heated or cooled and the like.

First, the image acquisition unit 211 of the CPU 21 of the state change tracking device 20 acquires the reconstructed images of the inspection target (subject H) periodically captured by the X-ray Talbot imaging device 1 from the image processing device 2 via the communication unit 27, and further acquires the elapsed time (step S001). The elapsed time refers to a time elapsed from when the inspection target is placed under the specific environment until when the X-ray Talbot imaging device 1 images the inspection target. The image acquisition unit 211 acquires a plurality of reconstructed images of the inspection target captured periodically one by one.

Next, the position matcher 215 of the CPU 21 performs position matching of the reconstructed images of the inspection target captured periodically (step S003). The image acquisition unit 211 does not need to execute the position matching for a first reconstructed image. As for the second and subsequent images, the image acquisition unit 211 performs position matching of second and subsequent reconstructed images with reference to, for example, the first reconstructed image.

The corrector 214 of the CPU 21 acquires the shape of the inspection target and/or the subject in the captured reconstructed image, and corrects the inclination, position, and size of the second and subsequent reconstructed images on the basis of the shape and/or the subject acquired in the first image (step S005). As for the first reconstructed image, the corrector 214 does not need to correct. As for the shape and/or the subject of the second and subsequent reconstructed images, the corrector 214 corrects the shape and/or the subject of the second and subsequent reconstructed images with reference to, for example, the shape and/or the subject of the first reconstructed images. As a result, each position of the inspection target may be matched to each position of the reconstructed image.

Next, the state change tracker 213 of the CPU 21 nondestructively tracks the state change of the inspection target by a plurality of reconstructed images acquired by periodically imaging the inspection target under the specific environment and the elapsed time thereof. The state change tracker 213 extracts the feature amount at each position of the reconstructed image using a plurality of reconstructed images captured over time and the elapsed time thereof (step S007).

The state change tracker 213 first extracts the feature amount at each position of the first reconstructed image. The state change tracker 213 stores the feature amount at each position of the first reconstructed image in the database 23a. The state change tracker 213 sequentially stores the feature amount at each position of the second and subsequent reconstructed images in the database 23a.

Herein, the feature amount at each position of the reconstructed image includes the signal intensity and the signal intensity distribution at each position of the Talbot image, for example. The signal intensity at each position of the Talbot image means magnitude of a signal value in each pixel of the reconstructed image (small-angle scattered image or differential phase image). The signal intensity distribution of the Talbot image means a degree of variation in signal intensity in a certain region, and may be indicated by a statistic such as a standard deviation, for example. The signal intensity and the signal intensity distribution at each position of the Talbot image are examples of the feature amount, and the feature amount is not limited thereto.

The state change tracker 213 plots the signal intensity or the signal intensity distribution of the Talbot image indicating the extracted feature amount at each position of the reconstructed image along the ordinate of a graph, and plots the elapsed time when capturing the reconstructed image along the abscissa of the graph, and creates the calibration curve by using a least squares method and the like (step S009). That is, the state change tracker 213 creates the graph by plotting the signal intensity or the signal intensity distribution of the Talbot image indicating the feature amount at each position of the reconstructed image with respect to the elapsed time in which the inspection target is placed under the specific environment, and approximating the same to a straight line by the least squares method and the like.

The state change tracker 213 determines whether the inspection target reaches its limit due to generation of the crack of the inspection target before the inspection target is imaged next time. In a case where the crack is generated in the inspection target (Yes at step S011), the state change tracker 213 shifts to step S013. In contrast, in a case where no crack is generated in the inspection target (No at step S011), the state change tracker 213 returns to step S001. The image acquisition unit 211 of the CPU 21 acquires the next reconstructed image and the elapsed time, and repeats the processing from step S003 to step S011 for the second and subsequent reconstructed images.

That is, the state change tracker 213 extracts the signal intensity or the signal intensity distribution of the Talbot image from the reconstructed image acquired next, plots the signal intensity or the signal intensity distribution of the Talbot image along the ordinate of the graph, and plots the elapsed time along the abscissa of the graph, and approximates the same to a straight line by the least squares method and the like, thereby creating the calibration curve up to immediately before the crack is generated in the inspection target.

At step S013, the state change tracker 213 extracts the feature amount correlated with the elapsed time from the calibration curve of the elapsed time when the crack is generated and each feature amount. In a case where the crack is generated in a resin component, a change in signal intensity or a change in signal intensity distribution correlated with the elapsed time occurs in a region corresponding to a crack generation position of the Talbot image. Therefore, the state change tracker 213 specifies a position where the change occurs in the feature amount and extracts the feature amount related to this position.

Figure 6:
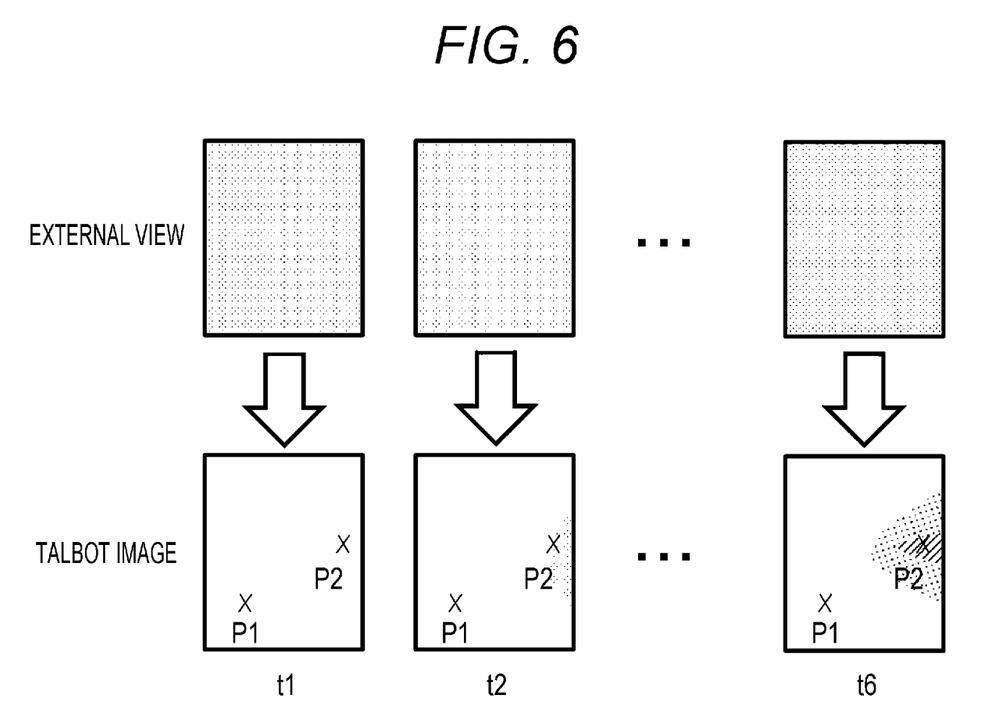
FIG. 6 is an explanatory view illustrating a concept in which a state change tracker of a CPU of the state change tracking device extracts a feature amount correlated with an elapsed time.

FIG. 6 is an explanatory view illustrating a concept in which the state change tracker 213 of the CPU 21 of the state change tracking device 20 extracts the feature amount correlated with the elapsed time. At step S013, for example, the state change tracker 213 sequentially extracts the signal intensity (an example of the feature amount) of the Talbot image from time t0 to elapsed times t1, t2, . . . , and t6 after the inspection target is placed under the specific environment at intervals of 24 hours (one day equivalent). In FIG. 6, the crack is generated at elapsed time t7 not illustrated.

An appearance illustrated in FIG. 6 illustrates an image of an appearance of a certain resin component (absorption image of normal X-ray), and the Talbot image illustrates a corresponding differential phase image or small-angle scattered image of the same resin component. As illustrated in FIG. 6, for example, no change appears in the image of the appearance of the resin component (absorption image of normal X-ray) even after a lapse of time at elapsed times t1, t2, . . . , and t6.

In contrast, in the Talbot image, no change appears even after the lapse of time at elapsed times t1 to t6 at a point P1, but a change in signal intensity correlated with the elapsed time occurs at a point P2 after the lapse of time at elapsed times t2 to t6.

That is, at the point P2 of the Talbot image, the change in signal intensity occurs at elapsed time t2, and there is the change in signal intensity immediately before the generation of the crack at elapsed time t6.

In this manner, in a case where the crack is generated in the resin component, the change in signal intensity or the change in signal intensity distribution correlated with the elapsed time occurs in a region corresponding to the crack generation position of the Talbot image. Therefore, the state change tracker 213 specifies the position where the change occurs in the feature amount of the Talbot image (for example, the point P2 of the Talbot image), and extracts the feature amount related to this position.

Returning to FIG. 5, at step S015, the state change tracker 213 calculates the calibration curve of the feature amount extracted at step S013 up to the elapsed time when the crack is generated, extrapolates the calibration curve and derives the feature amount corresponding to the life of the inspection target to determine the same as the threshold, then ends the generation processing of the database 23a.

Figure 7:
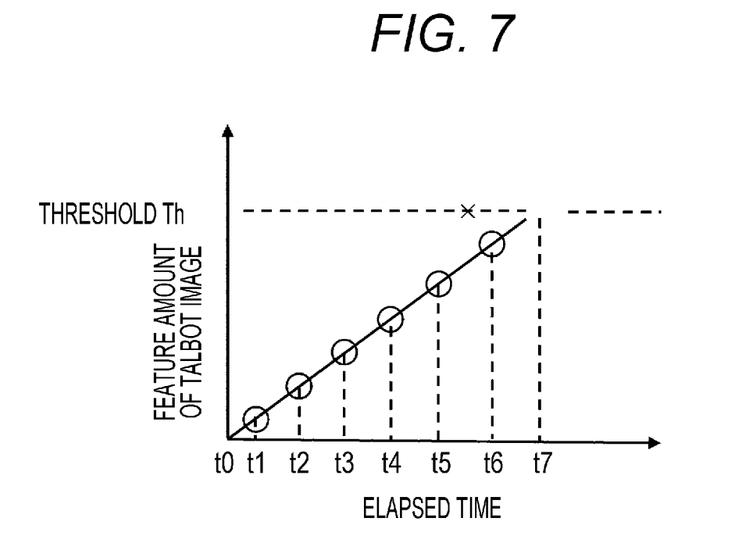
FIG. 7 is an explanatory view illustrating a graph of a calibration curve for the state change tracker of the CPU of the state change tracking device to estimate a threshold of the feature amount corresponding to a life of an inspection target.

FIG. 7 is an explanatory view illustrating the graph of the calibration curve for the state change tracker 213 of the CPU 21 of the state change tracking device 20 to estimate the threshold of the feature amount corresponding to the life of the inspection target.

In the graph of the calibration curve illustrated in FIG. 7, the elapsed time is plotted along the abscissa of the graph, and the feature amount at a predetermined position of the Talbot image (for example, the signal intensity at the predetermined position (point P2 in FIG. 6) of the Talbot image) is plotted along the ordinate. In FIG. 7, the state change tracker 213 of the CPU 21 sequentially extracts the signal intensity (an example of the feature amount) of the Talbot image from time t0 to elapsed times t1, t2, . . . , and t6 after the inspection target is placed under the specific environment at intervals of 24 hours (one day equivalent), plots the same with circles, and further writes elapsed time t7 of the life when the crack is generated. The state change tracker 213 creates this graph for the feature amount at each position of the Talbot image and derives the calibration curve, and extracts the feature amount having high correlation with the elapsed time on the basis of the inclination of the calibration curve.

Herein, at elapsed time t7 after the inspection target is placed under the specific environment, the crack is generated at the point P2 of the Talbot image (FIG. 6). The signal intensity in the vicinity of the crack generation position of the Talbot image often changes in correlation with the elapsed time. Therefore, the vicinity of the crack generation position of the Talbot image becomes a predetermined position (for example, point P2 in FIG. 6).

The state change tracker 213 extrapolates the calibration curve of the feature amount at this predetermined position and estimates the signal intensity (feature amount of the reconstructed image) at this predetermined position of the Talbot image when the crack is generated at elapsed time t7, and sets the same as a threshold Th.

As a result, when the signal intensity (feature amount of the reconstructed image) at this position of the Talbot image of the subsequent inspection target reaches the threshold Th, it may be estimated that the inspection target reaches the end of the life.

In this manner, the state change tracker 213 extracts the feature amount at each position of the reconstructed images continuously changing until the inspection target reaches the end of the life by using a plurality of reconstructed images periodically captured.

As a result, the state change tracker 213 may generate the database 23a for deriving the threshold of the feature amount corresponding to the life of the inspection target.

It is assumed that the feature of the reconstructed image differs for each inspection target, and the feature of the reconstructed image also differs depending on a difference of the specific environment, specifically, a difference among the environment exposed to a specific chemical substance, the environment subjected to a stress, and the environment heated or cooled. Therefore, it is desirable that the state change tracker 213 create the calibration curve for each inspection target and create the calibration curve for each specific environment.

[Life Estimation Processing of Inspection Target]

Figure 8:
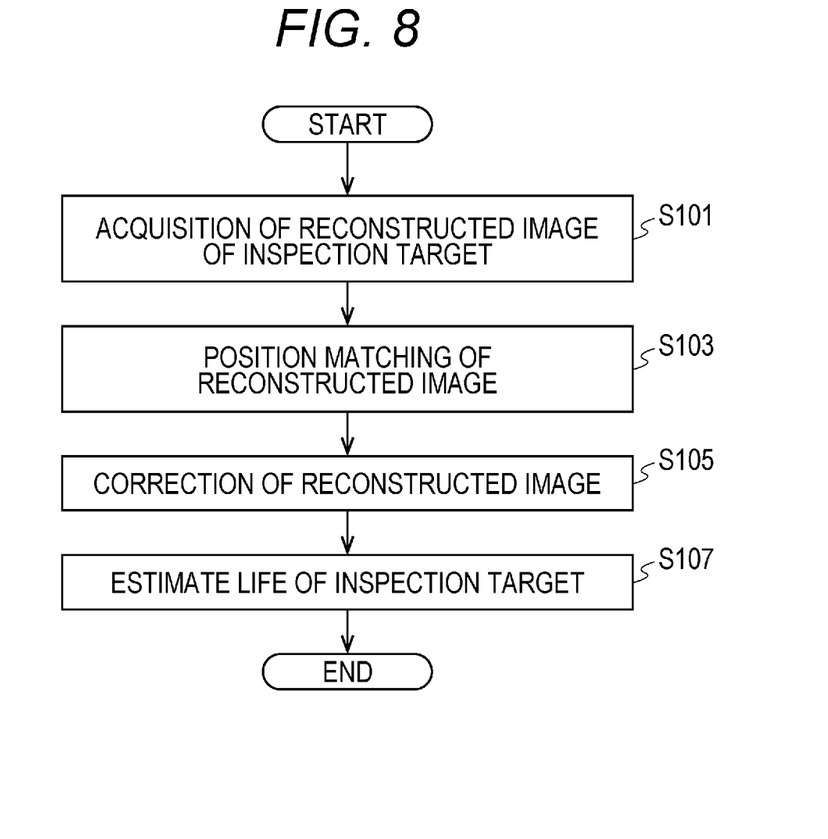
FIG. 8 is a flowchart illustrating processing of estimating the life of the inspection target by the life estimator of the CPU of the state change tracking device.

Next, processing of estimating the life of the inspection target (subject H) by the life estimator 212 having the above-described configuration is described by using a flowchart in FIG. 8 with reference to FIG. 1.

FIG. 8 is the flowchart illustrating processing of estimating the life of the inspection target (subject H) by the life estimator 212. In this embodiment, the inspection target is placed under the specific environment such as the environment exposed to a specific chemical substance, the environment subjected to a stress, and the environment heated or cooled and the like, for example.

First, the image acquisition unit 211 of the CPU 21 of the state change tracking device 20 acquires the reconstructed image of the new inspection target captured by the X-ray Talbot imaging device 1 from the image processing device 2 via the communication unit 27 (step S101).

Next, the position matcher 215 of the CPU 21 performs position matching of a plurality of reconstructed images of the inspection target captured over time with reference to the first reconstructed image at the time of the generation processing of the feature amount data illustrated in FIG. 5 (step S103).

In the life estimation processing of the inspection target, the life may be estimated when there is at least one captured reconstructed image, and it is desirable that there be a plurality of captured images. A plurality of reconstructed images captured over time does not need to be periodically captured, and may be captured at any elapsed time.

The corrector 214 of the CPU 21 acquires the shape of the inspection target and/or the subject in a plurality of captured reconstructed images, and corrects the inclination, position, and size of the reconstructed image of the life estimation processing on the basis of the shape and/or the subject acquired in the first reconstructed image at the time of the generation processing of the feature amount data (step S105).

The life estimator 212 of the CPU 21 extracts the feature amount at a predetermined position from the reconstructed image of the new inspection target. This predetermined position is extracted by the generation processing of the feature amount data illustrated in FIG. 5, the position where the crack is likely to be generated in the inspection target (for example, the point P2 of the Talbot image in FIG. 6).

The life estimator 212 applies the inclination of the calibration curve stored in the database 23a to the feature amount at this predetermined position, extrapolates the calibration curve, and estimates the life of the new inspection target from a time until the calibration curve reaches the threshold (step S107).

As a result, the life estimator 212 may predict a period from when the inspection target is placed under the specific environment until this reaches its limit (for example, crack generation) at an initial stage. Since the life is estimated on the basis of the change in feature amount of the Talbot image, an index of the life estimation may be quantified.

For example, in a case of extracting the signal intensity from one Talbot image (reconstructed image), which is the new inspection target, the life estimator 212 refers to the database 23a and creates a new calibration curve (calibration curve data) of the feature amount at a predetermined position of the new inspection target.

In this manner, the life estimator 212 creates the new calibration curve related to the feature amount at a predetermined position from the signal intensity at the predetermined position of the Talbot image, which is the new inspection target, extrapolates the calibration curve, and estimates the elapsed time or the elapsed day equivalent until this reaches the threshold of the feature amount at the predetermined position as the life. The life estimator 212 stores the created new calibration curve data in the database 23b.

At step S107, the life estimator 212 ends the life estimation processing when estimating the elapsed time or the elapsed day equivalent, which is the life of the new inspection target.

Figure 9:
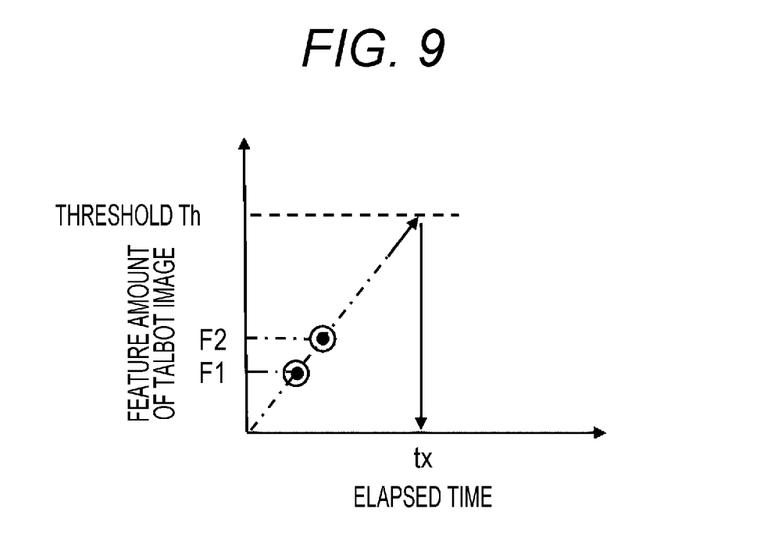
FIG. 9 is an explanatory diagram illustrating a graph of a calibration curve with which the life estimator of the CPU of the state change tracking device estimates a life of a new inspection target.

FIG. 9 is an explanatory diagram illustrating a graph of the calibration curve with which the life estimator 212 of the CPU 21 of the state change tracking device 20 estimates the life of the new inspection target.

In the graph of the calibration curve illustrated in FIG. 9, the elapsed time is plotted along the abscissa of the graph, and the signal intensity of the Talbot image (feature amount of the Talbot image) is plotted along the ordinate of the graph. In FIG. 9, for example, in a case where there is one signal intensity of the Talbot image, which is the new inspection target, the life estimator 212 refers to the database 23a and creates a new calibration curve until reaching the threshold Th of the feature amount of the new inspection target from signal intensity F1 of the Talbot image.

As a result, the life estimator 212 may derive elapsed time $t_x$ from when the new inspection target is placed under the specific environment until the feature amount reaches the threshold Th, that is, the life of the new inspection target from the signal intensity F1 of the Talbot image, which is the new inspection target. As a result, a test time for estimating the life may be shortened.

For example, in a case where the Talbot image, which is the new inspection target, is captured again after a predetermined time (predetermined days), the life estimator 212 creates a new calibration curve until reaching the threshold Th of the feature amount of the new inspection target on the basis of displacement in signal intensities F1 and F2 of the Talbot image and the database 23a.

As a result, the life estimator 212 may derive, from the signal intensity F2 of the Talbot image, which is the new inspection target, elapsed time $t_x$ from when the new inspection target is placed under the specific environment until the feature amount reaches the threshold Th, that is, the life of the new inspection target with higher accuracy.

[Effect]

As described above, according to this embodiment, the CPU 21 of the state change tracking device 20 of the X-ray imaging system 100 according to this embodiment is provided with the life estimator 212 that estimates the life of the inspection target on the basis of the reconstructed image of the inspection target captured by the X-ray Talbot imaging device.

The life estimator 212 may extract the signal intensity or the signal intensity distribution (the feature amount of the reconstructed image) at a predetermined position of the Talbot image from the reconstructed image of the inspection target, and create the calibration curve corresponding to the signal intensity or the signal intensity distribution related to the predetermined position, so that this may estimate the life of the inspection target in a short time.

Especially, the life estimator 212 of the state change tracking device 20 according to this embodiment may create the calibration curve of the new inspection target if there is at least one reconstructed image for the inspection target, so that it is possible to predict a period in which the inspection target reaches its limit (for example, crack generation) after being placed under the specific environment at the initial stage, and it is possible to shorten the test time for life estimation.

In a case where there are two or more reconstructed images captured at an interval, it is possible to create the calibration curve with higher accuracy on the basis of the displacement in signal intensity or the signal intensity distribution of the Talbot image (feature amount of the reconstructed image) and the database 23a, so that it is possible to estimate the life with higher accuracy.

Furthermore, since the life is estimated on the basis of a quantified index such as the signal intensity or the signal intensity distribution of the reconstructed image, the life of the inspection target (subject H) may be estimated objectively and with high accuracy as compared with human sensory evaluation (qualitative evaluation).

The life estimator 212 of the state change tracking device 20 estimates the life of the inspection target from the feature amount for each inspection target (for example, the signal intensity or the signal intensity distribution of the Talbot image). Since the change in internal structure of the inspection target is captured in the Talbot image, it is possible to clarify a progress until the inspection target reaches its limit.

The life estimator 212 of the CPU 21 of the state change tracking device 20 according to this embodiment may be widely applied to prediction of the life regarding not only the crack but also the void, weld, minute crack, fiber orientation and the like as the life of the inspection target.

The state change tracking device 20 according to this embodiment is provided with the image acquisition unit 211, the life estimator 212, the state change tracker 213, the corrector 214, and the position matcher 215 in the CPU 21, and executes each processing, but the execution of each processing is not limited thereto.

For example, the image processing device 2 may be formed with functions of the image acquisition unit 211, the life estimator 212, the corrector 214, and the position matcher 215, and the state change tracking device 20 may be formed only with a function of the state change tracker 213. In this case, for example, the state change tracker 213 may manually extract the feature amount (signal intensity or signal intensity distribution of the Talbot image) from the reconstructed image and manually plot the feature amount.

Although embodiments of the present invention have been described and illustrated in detail, the disclosed embodiments are made for purposes of illustration and example only and not limitation. The scope of the present invention should be interpreted by terms of the appended claims.

What is claimed is:

1. A state change tracking device comprising:
a hardware processor that non-destructively tracks a state change over time of an inspection target by analyzing a plurality of reconstructed images that are acquired over time by an X-ray Talbot imaging device, imaging the inspection target being placed under a specific environment, each of the plurality of reconstructed images being generated from a plurality of moire images.

2. The state change tracking device according to claim 1, wherein
the hardware processor extracts a feature amount of the reconstructed images continuously changing until the inspection target reaches an end of a life by using the plurality of reconstructed images captured over time, and derives a threshold of the feature amount corresponding to the life of the inspection target.

3. The state change tracking device according to claim 2, wherein
the hardware processor plots the feature amount with respect to an elapsed time in which the inspection target is placed under the specific environment to create a calibration curve.

4. The state change tracking device according to claim 3, wherein
the hardware processor estimates the life of the inspection target on the basis of the reconstructed images of the inspection target captured by the X-ray Talbot imaging device, and
the hardware processor extracts a feature amount from a reconstructed image of a new inspection target, extrapolates the feature amount to the calibration curve generated by the hardware processor, and estimates a life of the new inspection target.

5. The state change tracking device according to claim 1, wherein
the hardware processor performs position matching of the plurality of reconstructed images of the inspection target captured over time.

6. The state change tracking device according to claim 1, wherein
the hardware processor acquires a shape of the inspection target and/or a subject in the plurality of captured reconstructed images and corrects an inclination, a position, and a size of the reconstructed images on the basis of the acquired shape and/or subject.

7. The state change tracking device according to claim 1, wherein
the specific environment is an environment exposed to a specific chemical substance.

8. The state change tracking device according to claim 1, wherein
the specific environment is an environment subjected to a stress.

9. The state change tracking device according to claim 1, wherein
the specific environment is an environment heated or cooled.

10. The state change tracking device according to claim 1, wherein
the inspection target contains resin as a main component.

11. The state change tracking device according to claim 1, wherein
the reconstructed images are Talbot images generated by a Talbot effect including an absorption image, a differential phase image, and a small-angle scattered image.

12. An X-ray imaging system comprising:
a hardware processor that non-destructively tracks a state change over time of an inspection target by analyzing a plurality of reconstructed images that are acquired over time by an X-ray Talbot imaging device, imaging the inspection target being placed under a specific environment, each of the plurality of reconstructed images being generated from a plurality of moire images.

13. A state change tracking method of an inspection target, the method comprising:
generating a plurality of reconstructed images of an inspection target captured over time by an X-ray Talbot imaging device, each of the plurality of reconstructed images being generated from a plurality of moire images; and
non-destructively tracking a state change over time of the inspection target on the basis of the plurality of reconstructed images by a hardware processor.

14. A life estimating method of an inspection target, the method comprising:
generating a reconstructed image of an inspection target captured by an X-ray Talbot imaging device, the reconstructed image being generated from a plurality of moire images; and
estimating a life of the inspection target on the basis of the reconstructed image by a hardware processor.

* * * * *